US010302325B1

(12) United States Patent
Osborne

(10) Patent No.: US 10,302,325 B1
(45) Date of Patent: May 28, 2019

(54) AIR FILTER OPERATION AND USE MODIFICATION ACCORDING TO IDENTIFY A FILTER RESISTANCE OF AN AIR HANDLING UNIT

(71) Applicant: American Air Filter Company, Inc., Louisville, KY (US)

(72) Inventor: Michael W. Osborne, Louisville, KY (US)

(73) Assignee: American Air Filter Company, Inc., Louisville, KY (US)

( * ) Notice: Subject to any disclaimer, the term of this patent is extended or adjusted under 35 U.S.C. 154(b) by 57 days.

(21) Appl. No.: 15/492,826

(22) Filed: Apr. 20, 2017

Related U.S. Application Data

(60) Provisional application No. 62/327,405, filed on Apr. 25, 2016.

(51) Int. Cl.
| | | |
|---|---|---|
| *G05B 13/00* | (2006.01) | |
| *F24F 11/30* | (2018.01) | |
| *G05B 15/02* | (2006.01) | |
| *G06F 16/2455* | (2019.01) | |
| *F24F 11/63* | (2018.01) | |
| *F24F 11/64* | (2018.01) | |
| *F24F 11/39* | (2018.01) | |
| *F24F 11/47* | (2018.01) | |

(52) U.S. Cl.
CPC .............. *F24F 11/30* (2018.01); *G05B 15/02* (2013.01); *G06F 16/2455* (2019.01); *F24F 11/39* (2018.01); *F24F 11/47* (2018.01); *F24F 11/63* (2018.01); *F24F 11/64* (2018.01)

(58) Field of Classification Search
CPC ..... F23F 11/0086; F24F 11/0086; F24F 11/30
USPC .......................................................... 700/276
See application file for complete search history.

(56) References Cited

U.S. PATENT DOCUMENTS

| | | | | |
|---|---|---|---|---|
| 6,711,525 B1 * | 3/2004 | Fox | ...................... | B01D 35/143 |
| | | | | 702/184 |
| 9,200,995 B2 * | 12/2015 | Ahola | .................. | G01N 15/082 |
| 9,702,577 B1 * | 7/2017 | Lachapelle | .............. | F24F 11/30 |
| 2005/0247194 A1 * | 11/2005 | Kang | ................. | B01D 46/0086 |
| | | | | 95/19 |

(Continued)

OTHER PUBLICATIONS

Trust Insider, Technical Tips: Choosing the right HVAC filter, Jan. 5, 2015, Energy Trust InsiderEnergy, pp. 3 (Year: 2015).*

(Continued)

*Primary Examiner* — Suresh Suryawanshi
(74) *Attorney, Agent, or Firm* — Middleton Reutlinger

(57) ABSTRACT

The present disclosure is related to an air filter operation and use modification system. The system properly determines average filter resistance based upon determined air velocities in the air handling unit. Once accurate average filter resistance is determined, various energy use measurement determinations can be made for a proposed filter in the system. Such determinations can be based on estimated or desired filter energy use measurements. The system can modify the air handling unit operations to meet the proposed filter energy use measurements. Furthermore, the user will have the ability to review the range of potential operational points and then be able to select the service cycle based on the air handling unit owner's preferred preventive maintenance and budget cycles.

10 Claims, 5 Drawing Sheets

(56) References Cited

U.S. PATENT DOCUMENTS

2013/0103352 A1* 4/2013 ter Horst ............ G01N 15/0826
702/182

OTHER PUBLICATIONS

Kruger, The Impact of Filter Loading on Residential HVAC Performance, Dec. 2013, Georgia Institute of Technology, pp. 87 (Year: 2013).*

* cited by examiner

AIR FILTER OPERATION AND USE MODIFICATION ACCORDING TO IDENTIFY A FILTER RESISTANCE OF AN AIR HANDLING UNIT

TECHNICAL FIELD

The present disclosure relates to a filter energy use measurement system and, more directly, a filter energy use measurement system that determines total energy measure and modifies the use of the filter as a result of energy estimation.

BACKGROUND

Air handling systems in commercial buildings utilize filtering apparatus for removing particulate material from the air flow passing through the air handling unit. These filtering apparatuses impact the measure of running the HVAC and air handling units because pressure drops caused by the filters directly increase energy requirements for moving air. Therefore, inherent within filtering air for particulate removal is an energy measure related to pressure drop across the filter.

Determination of the most appropriate filter apparatus to be utilized in the air handling unit can be dependent on multiple factors including whether the building is a standard office building or a clean room requiring HEPA or ULPA filters. Furthermore, with a wide variety of filtering apparatuses available for installation, determining the most appropriate or most efficient filtering apparatus can be exceptionally difficult.

Additionally, systems provided for the analysis of filtering use measurements often do not take into account appropriate building or air handling unit parameters. When determining energy measure calculations for a given filter, therefore, it is the case that the values determined are incorrect since they rely upon incorrect assumptions as to the data, and incorrect methods for measurement estimation. These incorrect assumptions may further magnify the total energy measure associated with filter use. As a result, selection of filtering apparatus options, or determination of particular filtering apparatus to be utilized in a specified environment, may be erroneously made based upon inaccurate measure estimations.

SUMMARY

The present specification is directed towards systems, methods, and apparatuses for estimating total use measurement of filter ownership, and utilizing more accurate energy measure estimations for filter operational adjustments. In some implementations, a method is set forth for operating an air handling unit according to certain operating metrics. The method can include steps of receiving data related to an air filter installation for the air handling unit and accessing a filter database to identify a filter resistance value for the air filter installation. The filter resistance value can be identified using the received data related to the air filter installation. The steps can further include determining an energy use measurement for the air filter installation, at least partially based upon the filter resistance value, and generating an optimal service cycle time for the air filter installation according to the energy measure and the filter resistance value. The optimal service cycle time can be generated for reducing the energy measure. The steps can also include modifying an operation of the air handling unit such that a notification is provided to a user according to the optimal service cycle time.

In other implementations, a non-transitory computer readable medium is set forth as storing instructions that when executed by one or more processors, cause the one or more processors to perform steps that include: receiving specification data collected during an operation of an air handling unit that includes a first air filter. The steps can also include receiving operational data that includes a pressure drop for the air handling unit when the first air filter is installed within the air handling unit, and determining a filter resistance for the first air filter according to the operational data and specification data. The steps can further include determining a first energy measure for operating the air handling unit with the first air filter, at least based on the filter resistance for the first air filter, identifying a second air filter using the filter resistance of the first air filter, and determining a second energy measure for operating the air handling unit with the second air filter. The steps can also include providing a notification that identifies the first air filter or the second filter as being associated with a lower energy measure.

In yet other implementations, a system is set forth as including one or more processors, and memory configured to store instructions that when executed by the one or more processors, cause the one or more processors to perform steps that include: determining an air filter resistance corresponding to an air filter of an air handling unit. The steps can also include determining an amount of energy associated with operating the air handling unit, at least partially based on the air filter resistance, and generating a predicted energy use measurement for operating the air handling unit based on the determined amount of energy. The steps can further include receiving a selection of a desired energy use measurement for the air handling system, comparing the desired energy measure to the calculated energy measure, and generating a service cycle for the alternative filter of the air handling system based on the comparing.

The filter measurement system can include an energy use measurement calculation engine, an average filter resistance determination engine, a total energy use measurement determination engine, and a filter operations engine. Further elements described herein can include a filter database for storing pressure drop of filter dust loading curves. The systems, methods, and apparatuses described in various implementations herein can collect information from the user, or from the air handling unit, regarding air handling unit characteristics such as filter system operating hours, time per day in operation, total system air flow, system air velocity, and/or fan system efficiency. Other related information can be provided by the user for total energy use measurement determination including filter change out cycles, recorded filter resistances, as well as a selection of one or more air filter optimization methods. Once an appropriate average filter resistance value is determined, the associated total energy measurement for a particular filter can be estimated. The total energy measurement determinations can be based on the information provided, accurate loading characteristics, and air flow values.

In response to these determinations, the system can then alter or modify the operational characteristics of an air handing unit. These alterations and modifications can be based upon customer expected energy use measurement estimations. Furthermore, the system can notify the user when more accurate measurement information, associated with the selected or analyzed filtering apparatus, is available.

In various implementations, the filter energy use measurement system described herein can use an energy use measurement calculation engine to determine power, energy (kWh), and/or energy costs in real currency. In other implementations, the filter energy use measurement system can include a filter resistance determination engine that can be in communication with the filter dust loading curve database. The resistance determination engine can determine a more accurate average filter resistance value reflective of a customer's in-situ use, filter type, and/or air flow speed across the air handling unit. The resistance determination engine can determine, in various examples, a correction factor, which can be used to perform filter resistance calculations. The correction factor, determined from testing loading of filters resistances at different velocities and applying an exponential factor on the non-standard velocity, can be more accurately representative of true test data and allow the calculation of filter resistance to be based upon a known initial resistance and velocity, and a current air handling velocity. In some embodiments, the correction factor can be correlated to actual test related data. In other embodiments, the correction factor can be estimated in order to generate standard test loading curves for a plurality of filters.

In various aspects, the total energy use measurement determination engine can take into account a variety of factors when determining a total energy use measurement associated with a particular filtering apparatus. Such factors can include labor costs, energy costs, and other related replacement costs associated with filter maintenance. The factors can also include, in some implementations, a dynamic optimization value of filter replacement based upon customer input related to desirable filter change-out cycles. Thus, the systems, methods, and apparatuses outlined herein can provide cost optimization based upon particular customer timing and use habits. In such implementations, the system can take into account selected service cycle times for operational optimums in order that a total cost of ownership can further reflect operator selected change-out timing.

In still further aspects, the various implementations can include a filter operations engine, which can optionally modify the air handling characteristics of the air handling unit based upon customer provided cost estimations in order to appropriately meet such estimations. Furthermore, the filter operations engine can notify the customer of when a filter change is needed and/or when there is an operational issue.

In some aspects, the present system provides an energy use measurement calculation engine that can rely upon an accurate average filter resistance for a specified filter. The energy use measurement calculation engine can use the average filter resistance to identify other potential filter apparatuses and compare them economically or on a cost basis.

In some implementations, the disclosure herein can include a computer program product that incorporates instructions that can be executed by a processor and stored in memory. The instructions can include one or more steps outlined in the methods discussed herein. In other implementations, a computer readable medium is set forth as storing instructions that include steps provided in the methods discussed herein.

Other implementations can include a non-transitory computer readable storage medium storing instructions executable by a processor (e.g., a central processing unit (CPU) or graphics processing unit (GPU)) to perform a method such as one or more of the methods described herein. Yet other implementations can include a system of one or more computers and/or one or more devices that include one or more processors operable to execute stored instructions to perform a method such as one or more, or a combination, of the methods described herein.

It should be appreciated that all combinations of the foregoing concepts and additional concepts described in greater detail herein are contemplated as being part of the subject matter disclosed herein. For example, all combinations of claimed subject matter appearing in this disclosure are contemplated as being part of the subject matter disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The implementations described herein relate to systems, methods, and apparatuses for estimating total cost of ownership for an air filter, and modifying a filter-related operation according to the total cost estimate. The systems, methods, and apparatuses enable estimation of the total cost of ownership based upon determined average filter resistance values. The systems, methods, and apparatuses described herein include, in various implementations, the ability to determine power requirements, energy requirements, and total energy measure associated with a particular filter apparatus in a particular implementation. The calculated energy values can be directly proportional to the determined average filter resistance and thus, the present disclosure includes various implementations for determination of such resistance.

In some implementations, the average filter resistance can reflect an experimentally determined correction factor, which more readily reflects the effect on the loaded filter pressure drops by the actual air speed of the air handling unit in which the filter apparatus is installed. In various implementations, the correction factor represents experimentally determined exponential factors applied to pressure drop and/or resistance drop calculations. In other implementations, the average filter resistance can be determined by an average filter resistance determination engine 106.

In various other implementations, the total cost of ownership includes determination of total energy use measurement, which is reflective of such correction factor. In some implementations, the correction factor reflects a variance based on an assumed air speed, and in other implementations the correct factor is reflective of the actual air speed in the analyzed air handling equipment.

The systems, methods, and apparatuses are described herein with reference to non-exhaustive exemplary implementations and with reference to the Figures. Additional description of these and other implementations of the technology are described below.

Figure 1:
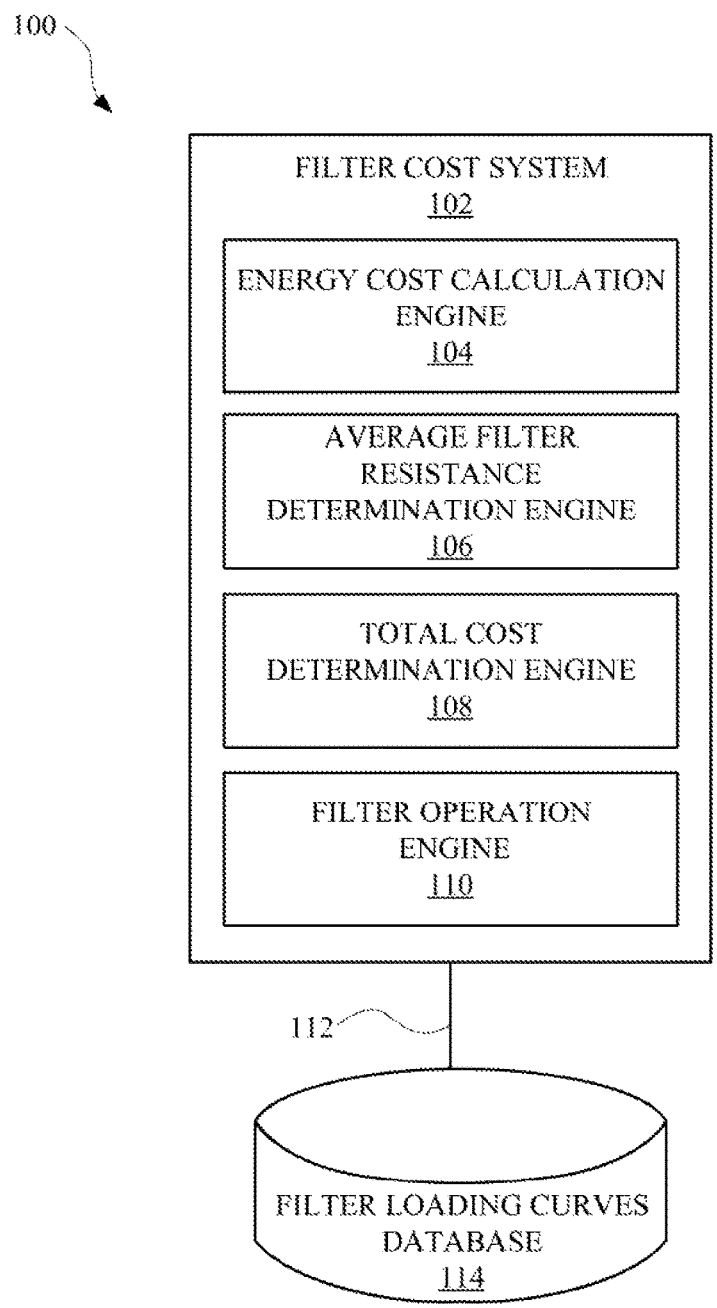
FIG. 1 shows a system for providing estimations of total energy measure and use modifications for a filter apparatus in accordance with the description herein.
Figure 2:
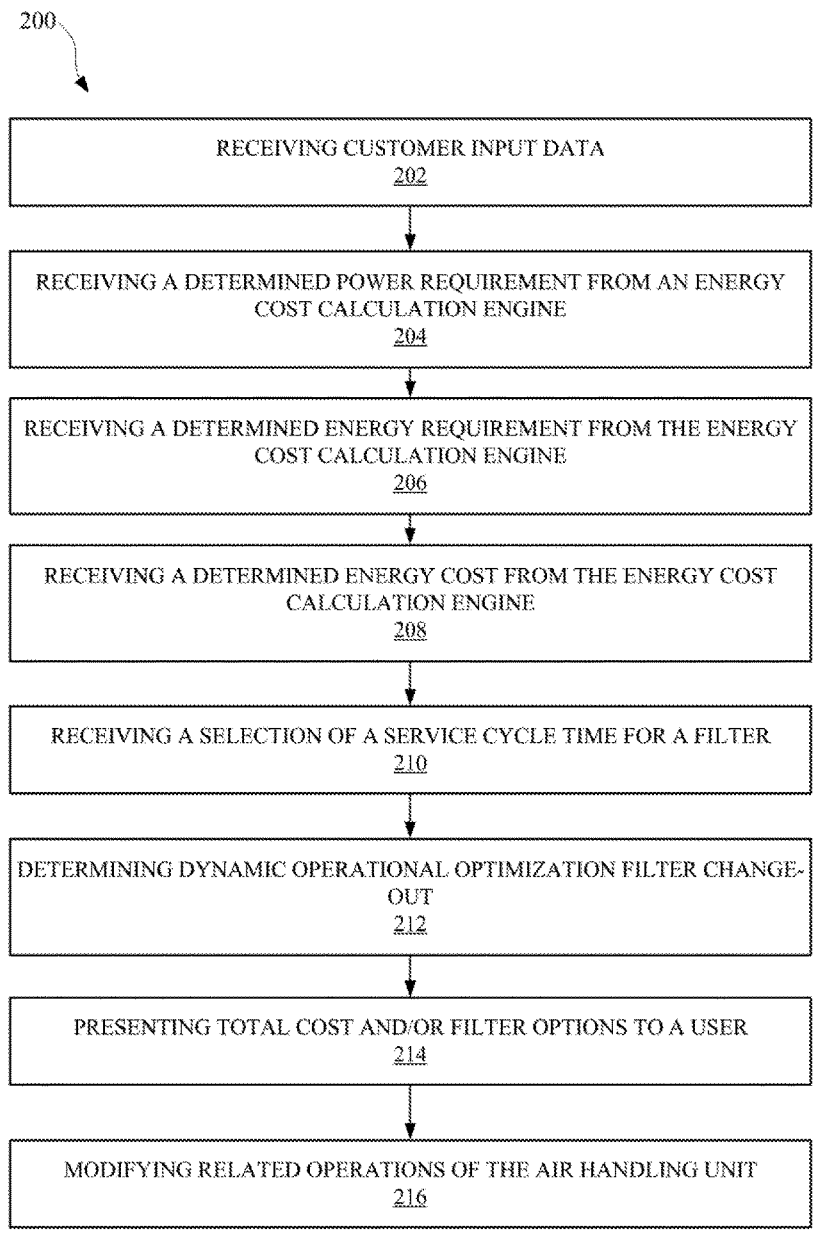
FIG. 2 shows a method that can be performed by a total energy use measure measurement determination engine as described herein.

FIGS. 1-5 depict systems, methods, and apparatuses for total energy measure determination and use modifications for air filters. Specifically, FIG. 1 provides a system diagram 100 of a filter cost system 102 that can, in various implementations, include an energy use measurement calculation engine 104, an average filter resistance determination engine 106, a total cost determination engine 108, and a filter operations engine 110. Each of the engines noted herein can be integrated into a computer having an associated memory with instructions stored thereon which, when executed by the computer, can implement the various methods and processes described. Further, each of the engines can reside on a single computer or individual computers, collectively or in portions thereof.

In various implementations, the filter cost system 102 can further include an associated storage device whereon a filter loading curve database 114 can be accessed via a communications interface 112. The storage device can be integrated into one or more computers that include a certain engine as noted herein, or the storage device can be remotely accessible by one or more of the engines.

The filter cost system 102 can utilize a total cost determination engine 108 that can determine the total cost of a selected filter, provided by a user, in a specific installation environment. The total cost determination engine 108 can receive input from other portions of the filter cost system 102 and provide, as output, a total cost per filter option to the user for the installation, filter optimization change-out, and related characteristics for comparison of costs. In providing such comparative costs of a selected filter in a particular installation environment, the total cost determination engine 108 can also modify air handling unit operations at block 216 of method 200 based upon selected filter and estimated costs provided to the user in selecting particular filters. Such modifications can include changing air handling unit operational characteristics to more evenly match estimated cost parameters, or alternatively, notify an operator of such out of bound system determinations.

The total cost determination engine 108 can, in various implementations, determine total costs associated with a selected filter for a particular installation. The total cost determination engine 108 can receive, in differing versions, input from the other system elements noted herein.

In some aspects, the total cost determination engine 108 receives, at block 202 of method 200, a number of customer input data including a selected comparative filter design to be analyzed such that the use costs for the selected filter can be determined given the installation parameters. Such user input data can include, in some implementations, the filter name, the filter manufacturer, the filter system operating hours, hours per day the fan is running, total system air flow, system air velocity, and fan system efficiency. In various implementations, the input data can also include the number of filters, filter costs, freight costs, disposal costs, labor-hours for installation, filter change-out staging costs, and other associated installation costs per service cycle.

The total cost determination engine 108 can further receive the determined power, energy, and energy use measurement at blocks 204, 206, and 208, from the Energy use measurement Calculation Engine 104. The total cost determination engine 108 can further receive the selected service cycle time for the filter at block 210 and determine, at block 212, a dynamic operational optimization filter change-out. The dynamic operational optimization filter change-out can be associated with an optimal filter change-out time given the filter pressure drop at the current system air velocity, the filter test dust loading resistance characteristics, the current time in service, normal change out service time, cost, and user desired change-out cycle.

Further, the systems, methods, and apparatuses described herein can include, within the total cost determination engine 108, the determination of the operational optimization filter change-out and the optimal air filter optimization point with variances noted. In other words, at block 212, the system can determine, operational optimum for a particular filter and installation parameters. This operational optimum can reflect the optimal calculated time frame for a filter to be in use given the loading, air speed, and cost calculations.

However, in some implementations, the calculated optimal cycle may not be relevant to a particular use. In such a case, the total cost determination engine 108 can determine, given a user preferred filter cycle time (or operational optimization value), a dynamic operational optimization for a filter given the loading characteristics and other factors. The other factors can include a preferred change-out cycle time noted by the user. The dynamic operational optimization can represent the most efficient use and cost of a particular filter given the determined average filter resistance, filter installation characteristics, and the customer filter change-out cycle preference.

The dynamic operational optimization point, which utilizes total cost as a determination element, can be determined for a given reference filter by use of any of a plurality of methods, including, for example, a full cycle optimization method. A full cycle optimization method can be used to derive a set of optimum total cost of ownership values using corresponding filter loading curves. The full cycle optimization method can use the service time of the reference filter and the filter resistance at the end of the service cycle. Another method can include a mid-cycle optimization method, in which a full service time of the reference filter is known, but the resistance at the end of the service cycle is not known. As a result, the calculation can be based upon the current time in service and the current resistance. Therefore, a set of optimum total cost of ownership values is determined using filter loading curves corresponding to the current time in service and the current resistance. Yet another method can include a dust load optimization method, in which a dust mass loading rate for the reference filter is applied to the reference filter and to optional filters. A set of optimum total cost of ownership values can then be derived using corresponding filter loading curves and average filter resistance determinations noted herein. Another method can include a life cycle cost method in which, when corresponding filter test data is not available, an energy equation can be used to calculate the energy use measurement for the filter service cycle. The energy equation can use initial and final filter resistance values, and a service cycle that corresponds to the filter change-out period. This method can optionally not use corresponding filter test data and therefore can be a less accurate comparative method in determining total cost of ownership and estimated energy efficiencies.

The total cost of ownership can further be determined, in various aspects, by the total cost determination engine 108 based upon one or more of the four scenarios noted, namely: Full Cycle, Mid-Cycle, Dust Load, and Life Cycle Costs. Further, the dynamic optimization determination for the selected filter can be created by either of the methods noted and can be implemented based upon a more accurate average filter resistance calculation, which directly impacts energy usage costs for the selected filter over the life of the filter installation.

The total cost determination engine can utilize the four scenarios in a comparative dynamic operational optimum filter determination in which a preferred service cycle is selected for determining operational optimum filters. Preferred operational optimum/change determinations (e.g., block 212) can, in various implementations, be made to provide the user with an accurate total cost of ownership. The total cost of ownership determination can be associated with a user entered operational change-out cycle wherein calculations and associated costs are optimized for efficient energy use in relation to the pre-selected change-out cycle. In standard filter cost analytics as noted, the optimal filter change-out is generally provided based upon optimum pressure drop and cost analysis, for example, where pressure drop and power required increase thereby negating the opportunity to consider the full range of the filter's dynamic performance capabilities. Thus, by merely denoting a pseudo-economic optimal point without taking into account user preference, an unusual service life, for example 10.43 months may be determined by a total cost system. Such a pseudo-economic optimum point for filter use is neither convenient for most air handling equipment operators to make annual budgets or to set up preventive maintenance (PM) schedules. Budget or PM schedules, for most AHU operators, work best in 3, 6 or 12 months intervals for 12 months or less, and for greater than 12 months, the 18, 24 or 36 months facilitate better management. Thus, a selected, or user preference, dynamic operational optimum can be taken into account when determining economic efficiency and total cost. The system noted herein allows for selecting such a service cycle time for a user defined operational optimum for the filter or filter sets. In this way, the total cost of ownership reflects the timing that the user/operator would prefer and correlates such cycle time frame into the total cost comparative calculations.

After determining a selected dynamic operational optimum, the total cost determination engine 108 can present the total cost per filter options to the user, and comparatively display one or a plurality of filters for installation. The user can then be presented with true total cost determinations for the selected filters taking into account the various aspects noted, including appropriate filter resistance values when used in an air handling unit with air speeds not represented by the filter loading curves typically utilized.

Figure 3:
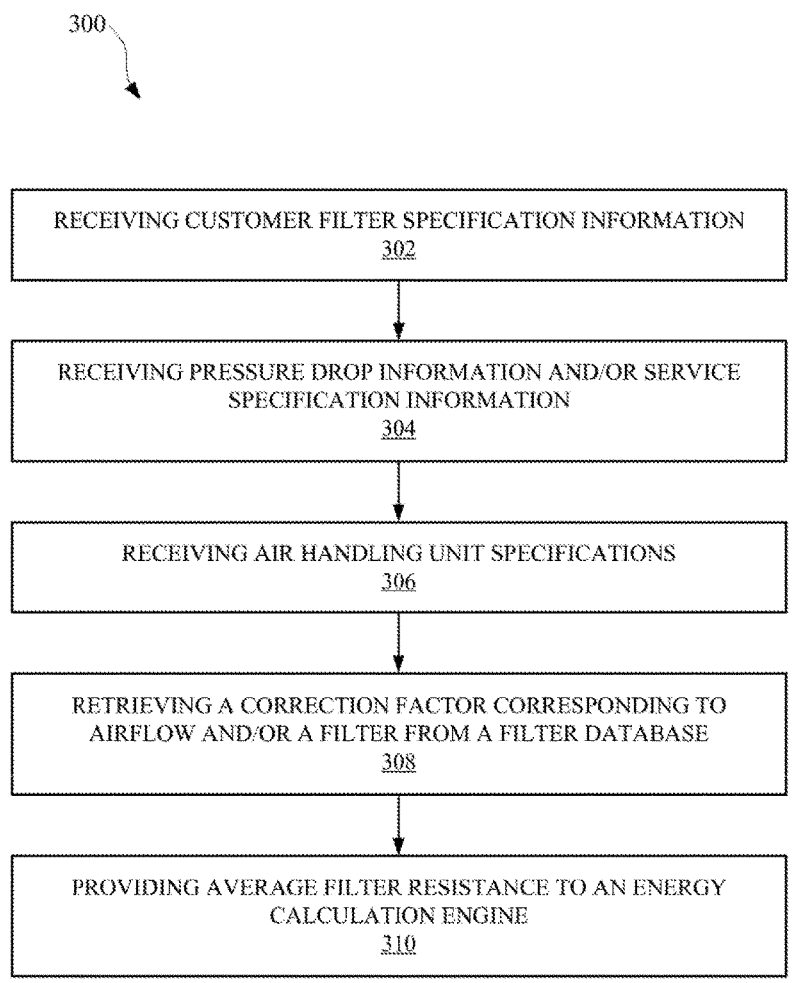
FIG. 3 shows a method that can be performed by an average filter resistance engine as described herein.

The system 100 described herein can include in some versions an average filter resistance determination engine 106, shown in FIG. 3. Determining an accurate average filter resistance can require further information from the user, such as the AHU characteristics, which can include air speed. In this way, it can be ensured that the pressure drop across the filter is accurately calculated and any associated energy use measurements are determined. Improper average filter resistance determinations can significantly skew total filter cost determinations.

The system 100 can receive customer filter specification information at block 302. Such customer filter specification information can include desirable or comparative filter installations, which the user is interested in for installation at a facility. Various known specification parameters from selected and chosen filter apparatus can be used by the system. The user can further provide, at block 304, pressure drop values for the current filter being used as well as service specifications for the installation such that adequate cost determinations can be made comparing the in-use filter apparatus and the selected comparative selected filter(s). Additional air handling unit specifications can be provided at block 306 so that the system 100 can determine filter pressure drop values and air handling unit speeds, typically in cubic feet per minute (CFM). Once air handling unit specifications are known, the system 100 at block 308 can retrieve, from the filter database, a correction factor for the particular air speed and filter apparatus entered by the user such that a true average filter resistance can be determined at block 310.

Determined energy values and/or energy use measurements can be proportional to the average filter resistance values for the reference/selected comparative filter, which can be derived as noted herein either empirically or through calculations. As the air volume for any air handling unit decreases, so does the velocity through the filters. As such, any energy use measurement determination must correctly compensate the determined average filter resistance for the change in air velocity within the air handling unit. In various embodiments, this can be done by the use of previously determined exponent factors, similar to the fan laws noted herein, to derive an accurate estimation for the average filter resistance of selected filter, and subsequently the calculated energy values related to that selected filter.

In various implementations, energy use measurements are adjusted so that calculated energy use measurements are based upon accurate characteristics of filter use. The actual air speed in use can be less than the maximum design air velocities in the air handling unit, which are typically about 500 feet per minute (FPM). The standard filter loading curves, typically determined at 492 FPM, when applied directly to air velocities other than the standard without correction, will skew any calculated average pressure drop value. Thus, in determining the average filter resistance, a correction factor can be applied for non-standard airflow filter pressure drops and dust holding data to adjust the data in order to accurately represent when the air handling unit/system is operating at less than 500 FPM, for instance 400 FPM.

In some implementations, the system 100 presented herein can calculate a total cost of ownership including the cost of fan energy needed to overcome the resistance of the fan calculation. However, the resistance values used for the loaded or partially loaded filter resistance can be most often not known at velocities that differ from the standard air velocity used in the ASHRAE sampling methodology, or for other standards like EN or ISO air filter testing procedures. Thus, in some aspects, proper energy determination for a given filter is not done since it does not reflect appropriate resistance values. In average filter resistance determinations, as set forth herein, the data used for the selected comparative filter should be appropriately adjusted for changes in the air velocity other than the velocity value used under the standard testing conditions.

The standard estimation for pressure drop is found in the Equation (1) below, which provides the noted inaccurate correction factor of two relating pressure drop to air speed for typical real-world installation air speeds.

$$\frac{P_1}{P_2} = \left(\frac{CFM_1}{CFM_2}\right)^2 \qquad (1)$$

In instances where determined air-speeds are lower than the maximum speed or different from the velocity used in the sampling methodology noted above, a variable correction factor should be determined based upon the actual detected airspeed in the installation. In most installations, the airspeed can be below the standard 500 CFM sampling methodology airspeed. For example, at 400 CFM, a more appropriate correction factor in the range of 1.7 can more adequately represent the pressure drop and air speed correlation as determined based upon testing data taken with partially and fully loaded filters over a range of velocities, in the range of 100-600 FPM. Applying a higher exponent factor as the correction factor such as 2, in the above example, can overstate the energy usage related to the air filter when the air handling unit is actually utilizing a lower or variant air speed.

Further, as related to total energy use measurement determinations for air filters based on testing, it has been found that the correction factor exponent of 2 noted above also does not correctly predict the dust holding performance resistance curves at velocities different from the standard 492 FPM, which is typically used in the ASHRAE dust holding test. Thus, when calculating pressure drop and hence energy use measurement, improper pressure drop or resistance values lead to exaggerated or minimized total energy use measurements. An exponential value of approximately 1.5 is determined to be more accurate, and based on additional testing, the exponential values can range between 1.3 and 1.8, based upon the type of filter, its construction, the AHU airspeed, and the media within the filter. Applying a more accurate exponential or correction factor will allow for a more accurate calculation of the total energy use measurement associated with air filters.

Also, in actual practice it has been found that most air handling units (AHU) in hospitals and commercial buildings are designed to operate at a design point of 500 ft/min, but actually operate in the 250-450 ft/min (FPM) range. Thus, attempts to calculate the energy usage and costs of an air handling unit at a velocity, for example, of 300 ft/min without correcting the laboratory clean filter and dust loaded tested values, which are based upon the above relationship, will result in an inaccurate energy use measurement calculation. As a result, the calculated cost provided to an owner of the air handling unit could be misled by the inaccurate energy calculation and could make decisions on filter usage that adversely affect the economic operation of the air handling equipment and/or that negatively impact the air handling overall based upon such incorrect assumptions.

The filter cost system 100 can include, in some implementations, a filter loading curve database 114 representing standard test loading curves for filters. The standard test loading curves can include laboratory confirmed and/or corrected exponent factors that will be used in energy usage calculations to allow for properly determined average filter resistance values.

An additional drawback to utilization of the standard defined filter loading curves as noted above for air filter optimization is that such standardized testing is narrow in scope—only addressing normal particulate filters—with ASHRAE defined efficiencies up the MERV 16 using an aerosol particulate test dust known as "ASHRAE Dust." The system and method for total energy use measurement and use modification set forth herein can be applied to various other types of filters such as HEPA and gas phase chemical filters, where the aerosol can be non-particulate, such as HEPA test oils, such as PAO, DOP, DEHS, or molecular gaseous compounds, in which each aerosol can be applied to the test filter until a fully loaded situation is reached. The data from these loading curves can be applied either discreetly or in conjunction with a dust loading curve, to be used in determine optimal life and operational costs.

Thus, in various implementations, the average filter resistance determination engine 106 can have a filter loading curve database 114 that has a plurality of filter loading curves and exponent factors. Exponent/correction factors can be related to various filters and associated airspeeds in order to adequately determine a more accurate average filter resistance. The average filter resistance can be determined for a given air filter at a given airspeed installation, and can be based on a comparison between multiple air filters.

The adjustment for the average filter resistance can be made using experimentally determined exponent correction factors, which can be stored in the database 114 and indexed to various airspeeds and filter media. Based on actual testing, the exponential or correction factor can be, in some implementations, between about 1.3 and 1.8, and in other implementations the correction factor can be approximately 1.5. The average filter resistance determination engine 106 can provide the average filter resistance to the energy use measurement calculation engine 104.

Figure 4:
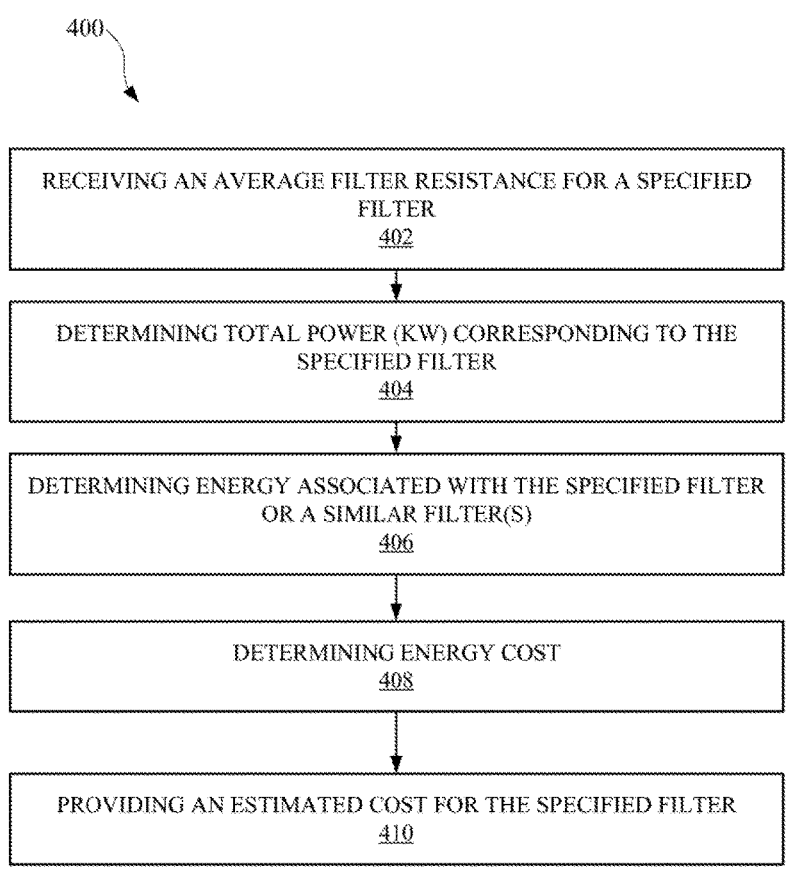
FIG. 4 shows a method that can be performed by an energy use measurement calculation engine for the various implementations described herein.
Figure 5:
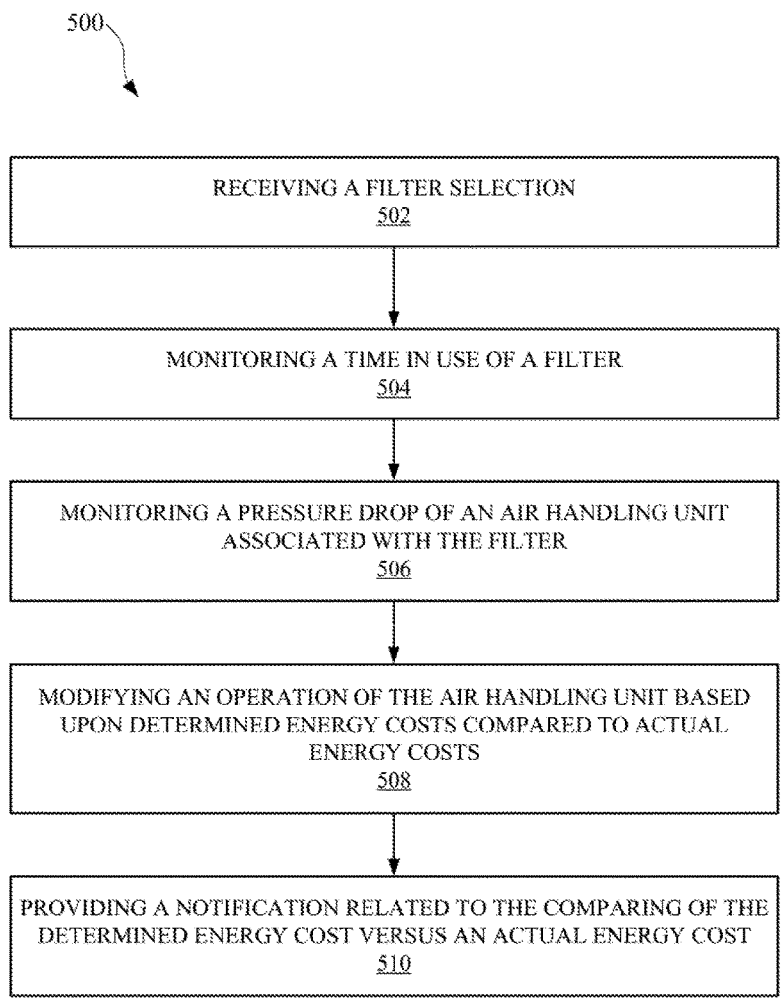
FIG. 5 illustrates a method that can be performed by a filter operations engine as is described herein.

The energy use measurement calculation engine 104 can determine energy use measurements associated with comparative filters installed within an air handling unit or HVAC system. The energy use measurement calculation engine 104, as shown in FIG. 4, can, at block 402, receive the determined average filter resistance for a specified filter, from the average filter resistance determination engine 106. The average filter resistance can reflect the particular filter characteristics and/or air speed for the AHU for proper determination of energy use measurements and associated power and energy.

In various implementations, the energy measure or cost calculation engine 104 can determine energy equations to derive energy usage and measures/costs according to Equations (2)-(4):

$$\text{Power (kW)} = \frac{(\text{Air Volume})(\text{Average Filter Resistance})}{(\text{Fan System Efficiency})(\text{Conversion Factor})} \quad (2)$$

$$\text{Energy(kWh)} = \frac{(\text{Air Volume})(\text{Average Filter Resistance})}{(\text{Fan System Efficiency})(\text{Conversion Factor})} \quad (3)$$

$$\text{Energy Use Measure} = \text{Energy(kWh)} * \text{Energy Rate (Currency/kWh)} \quad (4)$$

The energy use measurement calculation engine, at block 402 of method 400, receives the average filter resistance for a specified filter. Total power for the filter can be determined at block 404 according to Equation (2). The energy associated with the comparative or selected filter can be determined according to Equation (3). The energy calculation, at block 406, can be performed according to Equation (5) below, where the Conversion Constant is 1000 for SI units or 6390 is English units.

$$\text{Energy} = \frac{(\text{Air Volume Per Time})(\text{Average Pressure Drop})(\text{Service Cycle Time})}{(\text{Fan System Efficiency})(\text{Conversion Constant})} \quad (5)$$

At block 408 of method 400, energy use measurement can be determined based upon the energy rate and the determined total energy for the life of the filter apparatus given the average pressure drop and other filter specifications and air handling characteristics. At block 410, the estimated cost for the filter can be provided to the filter cost system and particularly to the total cost determination engine 108 which, in various versions, incorporates aspects of the determinations set forth herein.

Thus, the Energy use measurement Calculation engine 104 can more accurately determine ownership costs using such correction factors, and thus the system can provide improved estimated electrical energy use measurements, filter pressure drops, dust holding capacity, along with other ancillary costs of labor to change the filter and to dispose of the filter as well as applied procurement, warehousing, and maintenance staging, as well as cost avoidance items such as coil cleaning and dust cleaning.

Although the methods outlined herein and system are illustrated in separate figures for the sake of clarity, it is understood that one or more blocks of method can be performed by the same component(s) that perform one or more blocks of the method. For example, one or more (e.g., all) of the blocks of method and the system may be performed by processor(s) of a single handheld device or may be segmented into separate devices as may be warranted. Also, it is understood that one or more blocks of the method and system may be performed in combination with, or preceding or following, one or more blocks of method.

Many of the above mentioned steps may also be implemented by one or more processors which have associated memory with instructions, the processor configured to complete each of the steps thereby applying the various treated IR signal data to the trained model and or aid in training the model using a plurality of training examples.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method for operating an air handling unit according to certain operating metrics, the method comprising:
receiving data related to an air filter installation for the air handling unit, wherein the received data includes at least an air flow rate for the air handling unit;
accessing a filter database to identify a filter resistance value for the air filter installation, wherein the filter resistance value is identified using the received data related to the air filter installation;
determining an energy use measurement for the air filter installation at least partially based upon the filter resistance value;
adjusting the filter resistance according to a correction factor stored in an index of the database, wherein the index correlates the air flow rate to the correction factor;
generating an optimal service cycle time for the air filter installation according to the energy use measurement and the filter resistance value, wherein the optimal service cycle time is generated for reducing the energy use measurement;
and
modifying an operation of the air handling unit such that a notification is provided to a user according to the optimal service cycle time.

2. The method of claim 1, wherein accessing the filter database includes identifying a loading curve corresponding to the filter resistance value of a filter of the air filter installation over time.

3. The method of claim 2, wherein the loading curve is based on previously recorded test data associated with the filter.

4. The method of claim 2, wherein the filter resistance value is an average air resistance of the air filter over a range of time.

5. The method of claim 1, further comprising:
receiving a user input corresponding to a desired energy use measurement for the air filter installation, wherein the optimal service cycle time is generated for reducing the energy use measurement to at, or below, the desired energy use measurement.

6. The method of claim 1, wherein the notification provides an indication of an optimal time to replace a filter of the air filter installation.

7. A system, comprising:
one or more processors; and
memory configured to store instructions that when executed by the one or more processors, cause the one or more processors to perform steps that include:
determining an air filter resistance corresponding to an air filter of an air handling unit;
wherein the air filter resistance is determined by at least accessing a filter loading curve database that includes air velocity data collected at the air handling system over a period of time;
determining a correction factor based on an air flow rate measured at the air handling unit, wherein the air filter resistance is modified using the correction factor;
determining an amount of energy associated with operating the air handling unit, at least partially based on the air filter resistance;
generating a predicted energy use measurement for operating the air handling unit based on the determined amount of energy;
receiving a selection of a desired energy use measurement for the air handling system;
comparing the desired energy use measurement to the calculated energy use measurement; and
generating a service cycle for the filter of the air handling system based on the comparing;
modifying an operational characteristic of the air handling system based upon the generated service cycle for the filter, the modifying of the operational characteristics taking into account the air filter resistance modified using the correction factor.

8. The system of claim 7, wherein the service cycle corresponds to a time at which a notification is provided for replacing the air filter of the air handling unit.

9. The system of claim 7, wherein the amount of energy is further based on an average pressure drop of the air handling unit.

10. The system of claim 9, wherein the average pressure drop is provided by a filter loading curve database that includes previously collected air filter test data from which the average pressure drop data is derived.

* * * * *